United States Patent
Rice

(10) Patent No.: US 7,107,353 B1
(45) Date of Patent: Sep. 12, 2006

(54) SYSTEMS AND METHODS FOR DETERMINING A FUNDAMENTAL ROUTE BETWEEN CENTRAL OFFICES IN A TELECOMMUNICATIONS NETWORK

(75) Inventor: Roy Rice, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 727 days.

(21) Appl. No.: 10/093,600

(22) Filed: Mar. 7, 2002

(51) Int. Cl.
 *G06F 15/173* (2006.01)
(52) U.S. Cl. ......................... 709/240; 370/242; 398/10
(58) Field of Classification Search ........ 709/238–241; 370/242; 398/10
See application file for complete search history.

(56) References Cited

U.S. PATENT DOCUMENTS

| | | | |
|---|---|---|---|
| 6,452,906 B1 * | 9/2002 | Afferton et al. | 370/242 |
| 6,549,940 B1 * | 4/2003 | Allen et al. | 709/219 |
| 6,650,840 B1 * | 11/2003 | Feldman | 398/21 |
| 6,654,341 B1 * | 11/2003 | Chi et al. | 370/216 |
| 6,807,169 B1 * | 10/2004 | Mattathil | 370/352 |
| 6,904,061 B1 * | 6/2005 | Schmitt et al. | 370/535 |
| 6,909,700 B1 * | 6/2005 | Benmohamed et al. | 370/255 |
| 2002/0018258 A1 * | 2/2002 | Schmitt et al. | 359/118 |
| 2003/0163555 A1 * | 8/2003 | Battou et al. | 709/223 |
| 2004/0151298 A1 * | 8/2004 | Plunkett et al. | 379/220.01 |

* cited by examiner

Primary Examiner—Abdullahi Salad
(74) Attorney, Agent, or Firm—Merchant & Gould, LLC

(57) ABSTRACT

The invention is systems and methods for determining a fundamental route between central offices in a telecommunications network. The invention receives a "request for service" as location names or location information associated with the two selected locations. The location names or location information are correlated with one or more corresponding SONET carrier identification codes (SCID). If the two selected locations have intermediate locations between them, the invention determines a set of intermediate locations. Location information associated with each intermediate location can then be correlated with one or more corresponding SONET carrier identification codes (SCID). A set of routes can then be generated between the two user-selected locations, including routes between locations and sub-locations, and between sub-locations, each based upon fundamental route criteria. Fundamental route criteria can include the distance between points, transmission equipment utilization, transmission capacity, or redundancy. Finally, a fundamental route is selected based upon at least one fundamental route criteria.

8 Claims, 7 Drawing Sheets

Routing Report 22-Jan-02

A Location DNWDGAMA  Z Location NRCRGAMA

1st Ring:

| Sequence No | SCID No | Nodes |
|---|---|---|
| 1 | NG586R | DS3/OC3; DNWDGAMA, NRCRGAMA |
| 2 | NG308R | DS3; DNWDGAMA, NRCRGAMA |
| 3 | NG993R | DS3; DNWDGAMA, NRCRGAMA |
| 4 | NG104R | DS3/OC3, DNWDGAMA, NRCRGAMA |
| 5 | NG103R | DS3/OC3; DNWDGAMA, NRCRGAMA |
| 6 | NG307R | DS3; DNWDGAMA, NRCRGAMA |
| 7 | NG780R | DS3; DNWDGAMA, ALPRGAMA, CMNGGAMA, BUFRGABH, NRCRGAMA |
| 8 | NG617R | DS3; ATLNGABU, ATLNGASS, DNWDGAMA, NRCRGAMA, TUKRGAMA |

2nd Ring:
3rd Ring:

4th Ring:

*FIG. 7*

Routing Report 22-Jan-02

A Location DNWDGAMA  Z Location SMYRGAMA

1st Ring:

| Sequence No | SCID No | Nodes |
|---|---|---|
| 1 | NG164R | Due 2/1/02; DS3/OC3; SMYRGAMA, DNWDGAMA |

2nd Ring:
3rd Ring:

4th Ring:

*FIG. 8*

| Routing Report | 906 | | 22-Jan-02 | 902 | 908 |
|---|---|---|---|---|---|
| A Location | PWSPGAAS | | Z Location | SMYRGAMA | |

1st Ring: 904

| Sequence No | SCID No | Nodes |
|---|---|---|
| 1 | NG164R | DLLSGAES(DS3 Only), PWSPGAAS(DS3/OC3), SMYRGAMA |
| 2 | NG841R | SMYRGAMA, ASTL(DS3), DGVL(DS3), DLLS(DS3), PWSP(DS3), MRTTGAMA |

2nd Ring:
3rd Ring:

4th Ring:

*FIG. 9*

SYSTEMS AND METHODS FOR DETERMINING A FUNDAMENTAL ROUTE BETWEEN CENTRAL OFFICES IN A TELECOMMUNICATIONS NETWORK

TECHNICAL FIELD

The present invention generally relates to telecommunications, and more particularly to systems and methods for determining a fundamental route between central offices in a telecommunications network.

BACKGROUND OF THE INVENTION

Telecommunications service providers have extensive networks which can include landline equipment and fiber optic lines connecting central offices. Generally, a telecommunications network consists of one or more central offices with landline connections between central offices for carrying voice and/or data signals between central offices. The last central office located near the physical location of a subscriber and that physically connects to that subscriber's customer premises equipment is called an "end office". Each central office and end office house switching equipment that connects subscriber lines together so that voice and data signals can be transmitted between subscribers.

In conventional telecommunications networks, fiber optic lines can carry voice and/or data signal traffic between the central offices and end offices. Conventional fiber optic lines can vary in size and capacity. For example, one configuration of a telecommunications network that utilizes fiber optical lines is a synchronous optical network or "SONET". One type of SONET configuration is designated as "STS/DS-3/OCN", which is an acronym for "Synchronous Transport Signal; Digital Service, Level 3; Optical Carrier, Level n", which identifies a capacity and rate for digital signal transmission over a particular fiber optical line.

When a subscriber contacts a telecommunications service provider to initiate telecommunications network service between two particular locations in a network, then a "request of service" is initiated with the telecommunications service provider. A "request of service" is merely a request to route voice and/or data traffic between at least two particular central offices or end offices in a network. Since each location is serviced by at least one central office or end office, voice and data traffic must be routed between the respective central offices or end offices so that a subscriber can obtain telecommunications service between the two locations in the network.

However, in a telecommunications network utilizing fiber optic lines for transmission of voice and/or data signals, there are numerous combinations of signal routes that can be utilized for voice and/or data service between two central offices or hubs in such a network. For example, in an OC-48 lightweight optical network, there are at least 192×55=10, 348 different combinations of signal routes between any two central offices or hubs in the network. When a signal is transmitted through more than two central offices, the number of possible combinations of signal routes between the central offices increases.

When larger distances are involved between two locations in a network, voice and data traffic may have to be routed through more than two central offices. Thus, determining signal routes between central offices can be a time consuming and expensive proposition.

Moreover, several technical problems can arise in selecting a route for voice and data traffic between two particular locations in a network. First, more switching and transmission equipment than what is needed may be utilized for providing voice and data service between two location; thus resulting in inefficient utilization of resources and higher operating costs. Next, the selected signal route may not be the shortest route between two locations, thus resulting in longer communication times, and higher operating costs.

One attempt to address these problems utilizes a conventional spreadsheet to track signal routes between central offices or end offices. Operating company personnel manually key in data to a spreadsheet to update signal route information as needed or when known. When a request for service is received, operating company personnel determine an optimum signal route by manually sorting through rows and tables of spreadsheet data for particular route information between central offices.

An optimum signal route between two central offices or end offices in a telecommunications network is known as a "fundamental route". A fundamental route can be one of the most efficient transmission paths for voice and/or data traffic between two central offices or end offices in a conventional telecommunications network.

Therefore, a need exists for systems and methods for determining a fundamental route between at least two central offices in a telecommunications network.

A further need exists for systems and methods for determining a signal route between two locations in a telecommunications network.

Yet a further need exists for systems and methods for determining a fundamental route in response to a request for service.

SUMMARY OF THE INVENTION

The invention addresses and solves the above needs. The invention determines a fundamental route between central offices in a telecommunications network. In one exemplary embodiment, the invention can be a set of computer-executable instructions configured to operate on a computer with an associated database or storage device. The invention is also configured to provide a series of forms or user interface screens that assist a user in determining a fundamental route between two central offices or hubs in a telecommunications network. The user can make a "request for service" between two locations in an existing telecommunications network, by inputting the location names through the user interface. Typically, the locations can be central offices, end offices, or hubs. The invention receives the location names or location information associated with the two selected locations. The location names or location information can then be correlated with one or more corresponding SONET carrier identification codes (SCID). Each SCID corresponds with a particular route between at least two locations in the network. Typically, the SCID and corresponding routes are stored in a database or other memory device. If the two selected locations have intermediate locations between them, the invention determines a set of intermediate locations. Location information associated with each intermediate location can then be correlated with one or more corresponding SONET carrier identification codes (SCID). A set of routes can then be generated between the two user-selected locations, including routes between locations and sub-locations, and between sub-locations, each based upon fundamental route criteria. Fundamental route criteria can include the distance between points, transmission equipment utilization, transmission capacity, or redundancy. Finally, a fundamental route is selected based upon at least one fundamental route criteria.

In another exemplary embodiment of the invention, the invention is a method for determining a route between two locations in a network. First, the invention receives a request for service between two locations in a network. The request for service contains location information associated with the locations in the network. In response to a request for service, the invention correlates the location information with one or more associated identification codes that correspond to a particular route between the two locations in the network. Finally, the invention generates a fundamental route based upon at least one fundamental route criteria.

In yet another exemplary embodiment of the invention, the invention is a system for determining a route between two locations in a network. The system comprises a computer with an associated database. The computer receives a request for service between two locations in a network. The request for service contains location information associated with the locations in the network. In response to a request for service, the computer correlates the location information with one or more associated identification codes stored in the database that correspond to a particular route between the two locations in the network. Finally, the computer generates a fundamental route based upon at least one fundamental route criteria.

In yet another exemplary embodiment of the invention, the invention comprises a system for determining a fundamental route between two central offices in a telecommunications network. The system receives a request for service between two locations in a network. The request for service contains location information associated with the locations in the network. In response to a request for service, the system correlates the location information with one or more associated identification codes that correspond to a particular route between the two locations in the network. Finally, the system generates a fundamental route based upon at least one fundamental route criteria.

BRIEF DESCRIPTION OF THE DRAWINGS

FIG. 7 is a screen shot of another form of a screen user interface or webpage of a website that operates in conjunction with an exemplary embodiment of the invention.

FIG. 8 is a screen shot of another form of a screen user interface or webpage of a website that operates in conjunction with an exemplary embodiment of the invention.

FIG. 9 is a screen shot of another form of a screen user interface or webpage of a website that operates in conjunction with an exemplary embodiment of the invention.

DETAILED DESCRIPTION OF DISCLOSED EMBODIMENTS

The invention determines a fundamental route between central offices in a telecommunications network. In one exemplary embodiment, the invention can be a set of computer-executable instructions configured to operate on a computer with an associated database or storage device. The invention is also configured to provide a series of forms or user interface screens that assist a user in determining a fundamental route between two central offices or hubs in a telecommunications network. The user can make a "request for service" between two locations in an existing telecommunications network, by inputting the location names through the user interface. Typically, the locations can be central offices, end offices, or hubs. The invention receives the location names or location information associated with the two selected locations. The location names or location information can then be correlated with one or more corresponding SONET carrier identification codes (SCID). Each SCID corresponds with a particular route between at least two locations in the network. Typically, the SCID and corresponding routes are stored in a database or other memory device. If the two selected locations have intermediate or sub-locations between them, the invention determines a set of intermediate or sub-locations. Location information associated with each intermediate or sub-location can then be correlated with one or more corresponding SONET carrier identification codes (SCID). A set of routes can then be generated between the two user-selected locations, including routes between locations and sub-locations, and between sub-locations, each based upon fundamental route criteria. Fundamental route criteria can include the distance between points, transmission equipment utilization, transmission capacity, or redundancy. Finally, a fundamental route is selected based upon at least one fundamental route criteria.

Figure 1:
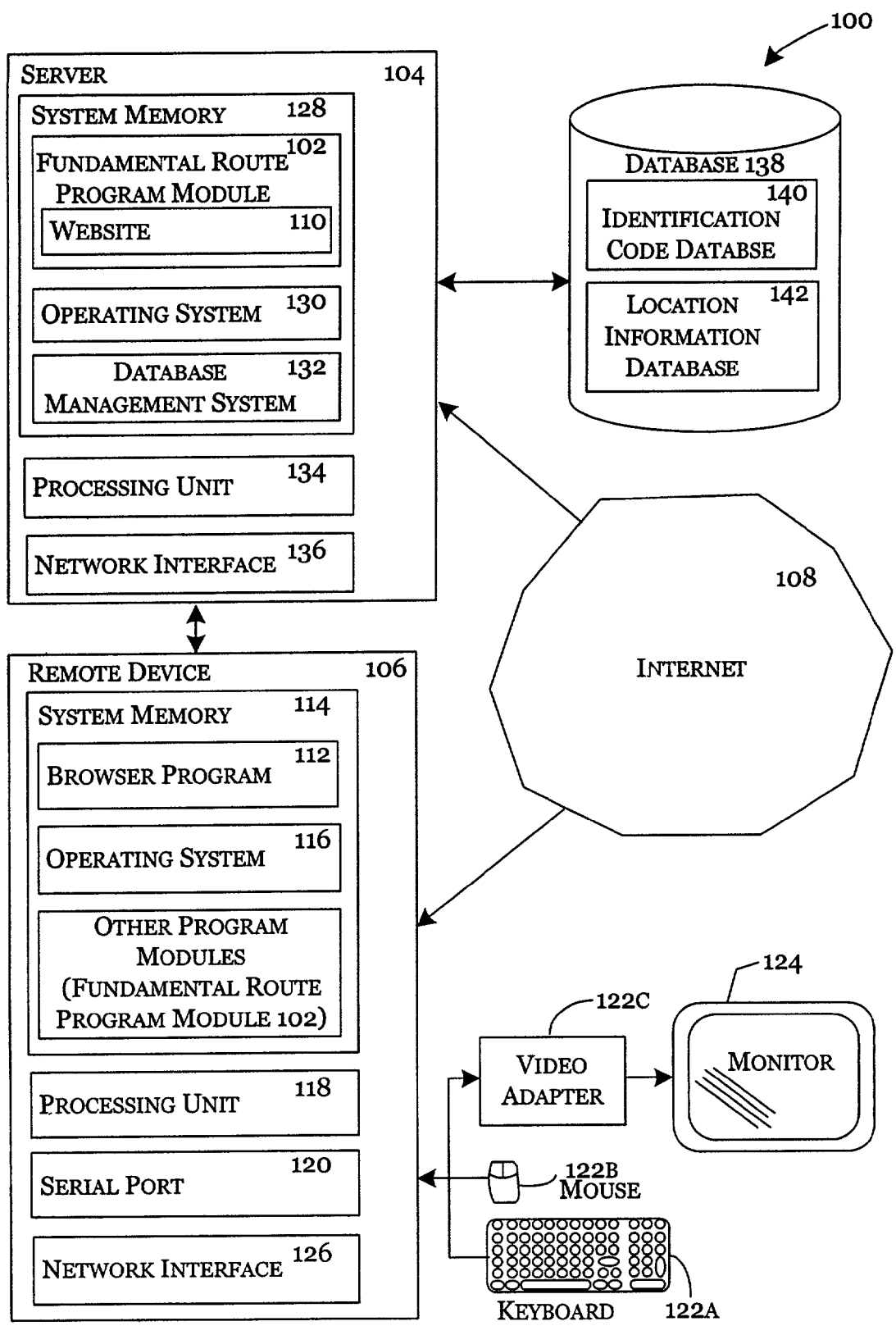
FIG. 1 is a functional block diagram illustrating an exemplary embodiment of the invention in a networked computer environment.

Particular embodiments of the invention will now be described in greater detail with reference to the drawings. FIG. 1 shows a functional block diagram illustrating an exemplary embodiment of the invention that is configured for determining a fundamental route between two central offices or hubs in a telecommunications network. In this embodiment, the invention is a set of computer-executable instructions that is configured to operate on a computer with an associated database or storage device within a distributed network environment 100. As shown, the invention includes one or more exemplary fundamental route program modules 102 for determining a fundamental route between two central offices or hubs in a telecommunications network. The fundamental route program module 102 may be configured for execution by a central server 104 that is accessible by a remote device 106 via a distributed computer network 108, such as the Internet. Moreover, a fundamental route program module 102 can comprise a website 110 for interacting with a user via a network such as the Internet.

Typically, a fundamental route program module 102 comprises computer-executable instructions for facilitating the process of determining a fundamental route between two central offices or hubs in a telecommunications network. The fundamental route program module 102 may be operable to access and to display an electronic database or catalog of routes between central offices. The fundamental route program module 102 may be further operable to permit user selection of location parameters and associated route parameters, such as those stored in a database or downloaded from a remote location. Furthermore, the fundamental route program module 102 may be operable to display selected fundamental route criteria or parameters for the user to view, select, or adjust. Moreover, the fundamental route program module 102 may be operable to permit selection of priority criteria in order to prioritize a selection of routes.

A remote device 106 may comprise a desktop computer, a laptop computer, a hand-held device, a personal digital assistant, a kiosk, or the like. In general, a remote device 106 may comprise a memory 114 for storing such things as an operating system 116, a browser program 110 or other program modules or data files, and a processing unit 118 for executing application programs, such as the browser program 112. The remote device 106 may also comprise a serial port 120 for communication with one or more input devices 122 such as a keyboard 122a, a mouse 122b, a video adapter 122c for communication with a display device or monitor 124, and a network interface 126 for communication with the distributed computer network 108 or a dedicated communications link. The input device 122 may be connected to the remote device 106 or may be connected to the network 108. As will be apparent to those of skill in the art, a remote device 106 may comprise additional features and components.

A remote device 106 may be configured for execution of a browser program 112 in order to view the website 110 and interact with the fundamental route program modules 102 at the central server 104. The remote device 106 may communicate with the server 104 via any well-known communications link, such as a local area network, a wide area network, the Internet, etc. For example, the communications link, or at least a portion thereof, may be a wireless network.

In some cases, the remote device 106 may be configured for executing one or more fundamental route program modules 102. Alternatively, the remote device 106 can communicate with a server 104 or server computer, which executes the one or more fundamental route program modules 102. In other cases, both the remote device 106 and the server 104 may execute one or more fundamental route program modules 102.

In general, a remote device 106 may comprise a memory 114 for storing such things as an operating system 116, a browser program 110 or other program modules or data files, and a processing unit 118 for executing application programs, such as the browser program 112. The remote device 106 may also comprise a serial port 120 for communication with one or more input devices 122 such as a keyboard 122a, a mouse 122b, a video adapter 122c for communication with a display device or monitor 124, and a network interface 126 for communication with the distributed computer network 108 or a dedicated communications link. The input device 122 may be connected to the remote device 106 or may be connected to the network 108. As will be apparent to those of skill in the art, a remote device 106 may comprise additional features and components.

The central server 104 may also comprise a conventional computer system configured to function as a network server. For example, the central server 104 may comprise a memory 128 for storing an operating system 130, one or more fundamental route program modules 102, a database management system (DBMS) 132, as well as other program modules and data files. The central server 104 may further comprise a processing unit 134 and a network interface 136. The central server 104 may also comprise or be in communication with an associated database 138 for storing data relating to the determining a fundamental route between two central offices in a telecommunications network.

The database 138 may comprise an identification code database 140, and a location information database 142. The identification code database 140 is operable for storing identification codes for particular routes between central offices. The location information database 142 is operable for storing a plurality of location information or data about the particular location of a central office.

Each of the databases 140–142 can be linked together so that information can be shared between each of the databases, or otherwise accessed collectively when needed. For example, information about a particular fiber optic carrier route may be stored in the identification code database 140, and location information input by the user may be stored in the location information database 142. If a user desires to select a particular location for later retrieval from the system 100, then the user can input the particular location at a later time, and the location information can be correlated to a corresponding SONET carrier identification code stored in the identification code database 140

Generally, the fundamental route program modules 102 at the central server 104 may be accessed from a remote device 106 via the distributed computer network 108, by way of a website 110. The website 110 may display to a user a series of forms or webpages designed to facilitate the entry of input data for the determination of a fundamental route between two central offices or hubs in a telecommunications network.

Alternatively, the fundamental route program modules 102 at the remote device 106 may be accessed by a user adjacent to the remote device 106 by way of an input device 122a–c. The user may view a series of forms or screen user interfaces designed to facilitate the entry of input data for the determination of a fundamental route between two central offices or hubs in a telecommunications network. A set of sample forms or screen user interfaces will be described in greater detail in conjunction with FIGS. 5–9.

When a user makes a selection of location information or data associated with at least two locations in a telecommunications network, the fundamental route program modules 102 can display the input data or selections by way of the display device or monitor 124 so that the user can edit, manipulate, and view his or her selection of location information.

After a user selects input location information or data, the selected input data or location data can be stored in the database 138 for later retrieval. The selected data can be also be accessed by the central server 104 or by one or more other databases 140–142 when needed.

The fundamental route program modules 102 may provide the user with the option to view a route between the two selected locations. For example, as the user selects his or her desired locations, the fundamental route program module 102 can create a sample route between selected locations for viewing by the user on a display device or monitor 124.

When the fundamental route has been completed, the fundamental route may be saved to a data file in an electronic format. For example, a finalized fundamental route may be stored in a data file in the database 138. Conventional methods and techniques for storing data in an electronic format can be utilized for a data file containing a fundamental route.

The central server 104 may comprise hardware and software components, such as a communications module 144 for communicating a fundamental route based upon a user's selected locations in a telecommunications network. The communications module 144 may send the fundamental route to a third-party so that network services can be expedited. In some instances, feedback or user-specific information can be received by the server 104 from a third-party. The fundamental route program modules 102 can then utilize the feedback or user-specific information to facilitate, to evaluate, or to complete selection of a fundamental route between two central offices in a telecommunications network.

Figure 2:
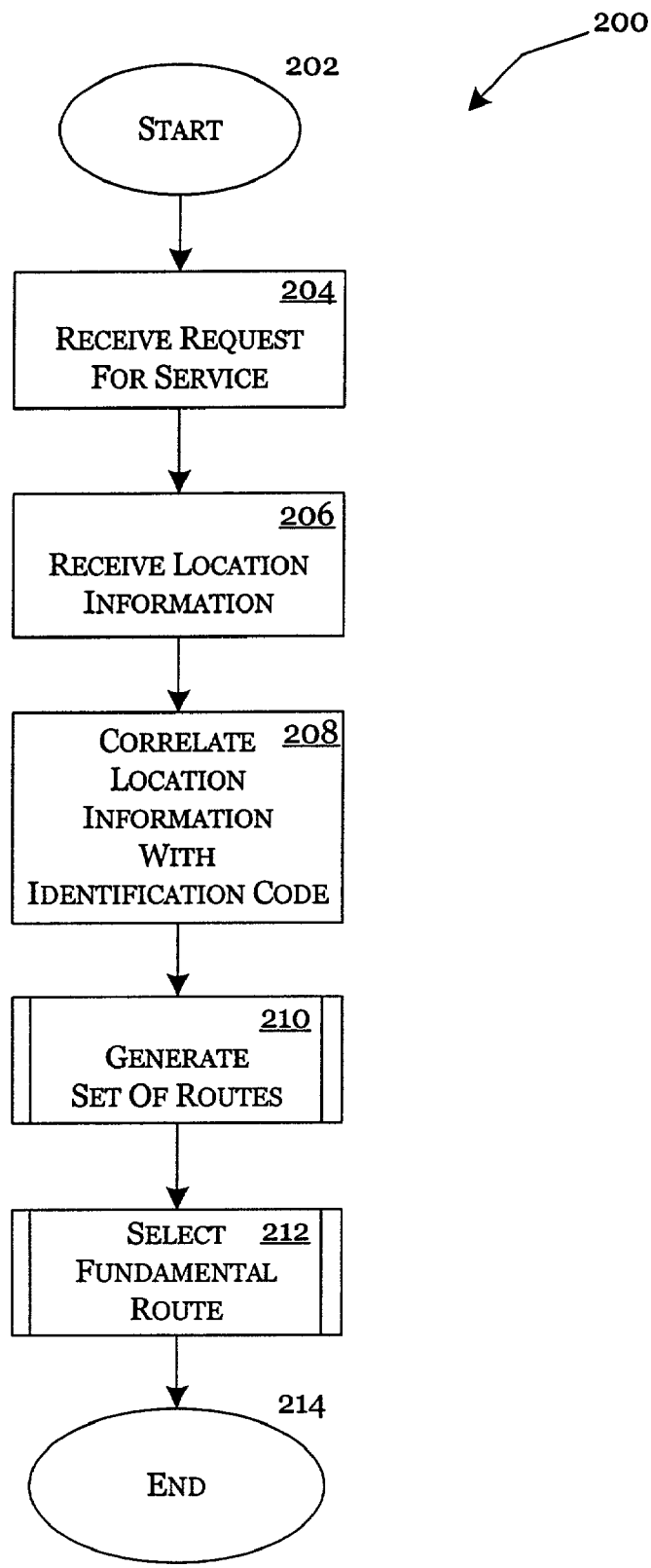
FIG. 2 illustrates an exemplary embodiment of a method according to the invention.

FIG. 2 illustrates an exemplary method 200 for determining a fundamental route between two locations in a telecommunications network. In block 202 the method 200 begins.

Block 202 is followed by 204 in which a request for service is received. Typically, a user initiates a request for telecommunications service between two locations. Telecommunications service includes voice and/or data services between two locations. Each location can be an end point in a telecommunications network, such as a location where customer premises equipment is installed for facilitating communications via the telecommunications network.

Block 204 is followed by step 206 in which location information is received. The desired user-selected locations are generally associated with information or data that can be identified with each location. For example, a user-selected location may be an end point associated with a unique central office or hub in a telecommunications network. Each central office or hub can be further identified by a unique location code such as "A" for Alpharetta, or "Z" for Dunwoody. Other location codes such as a unique alphabetic, alphanumeric, numeric, or symbolic code can be used to identify a location or hub in a request for service. For example, a Common Language Location Identifier (CLLI) code can be used to identify a central office, hub, or any other physical location and equipment. Either the user can input one or more location codes or one or more location codes can be determined by way reference to a related database containing unique location codes for a set of end points in a telecommunications network.

Block 206 is followed by block 208 in which the location information is correlated with a carrier identification code. A carrier identification code can be a SONET carrier identification code or SCID that identifies a particular voice and/or data signal route between two central offices or hubs in a telecommunications network. When a particular central office or hub is identified, a carrier identification code can be referenced in a related database containing location codes and unique SONET carrier identification codes between different locations.

Block 208 is followed by subroutine 210 in which a set of routes is generated. Using one or more correlated carrier identification codes and locations and/or sub-locations, route information between the two locations corresponding to the user-selected end points is generated. Note that route information can either be direct or indirect. Direct route information contains information or data that identifies a voice and/or data signal route directly between two central offices corresponding to the user-selected end points. Indirect route information contains information or data that identifies a voice and/or data signal route adjacent to one or more sub-locations between the two user-selected end points. In the event that a direct route between locations does not exist, a set of indirect routes between locations may be generated. Each indirect route contains sub-routes between sub-locations. One or more different combinations of sub-routes between sub-locations may exist for a set of two locations initially corresponding to two user-selected end points.

Subroutine 210 is followed by subroutine 212 in which a fundamental route is selected. Utilizing the set of routes generated in block 210, a fundamental route between two locations is selected. Typically, a set of routes is prioritized using fundamental route criteria. Fundamental route criteria can include distance between points, transmission equipment utilization, transmission capacity, or redundancy. When each route generated in subroutine 210 is prioritized according to one or more fundamental route criteria, the route or routes given the highest priority ranking is selected as the fundamental route. The fundamental route can then be output to the user in response to the initial request for service between two locations in a telecommunications network.

Subroutine 212 is followed by end block 214 in which method 200 ends.

Figure 3:
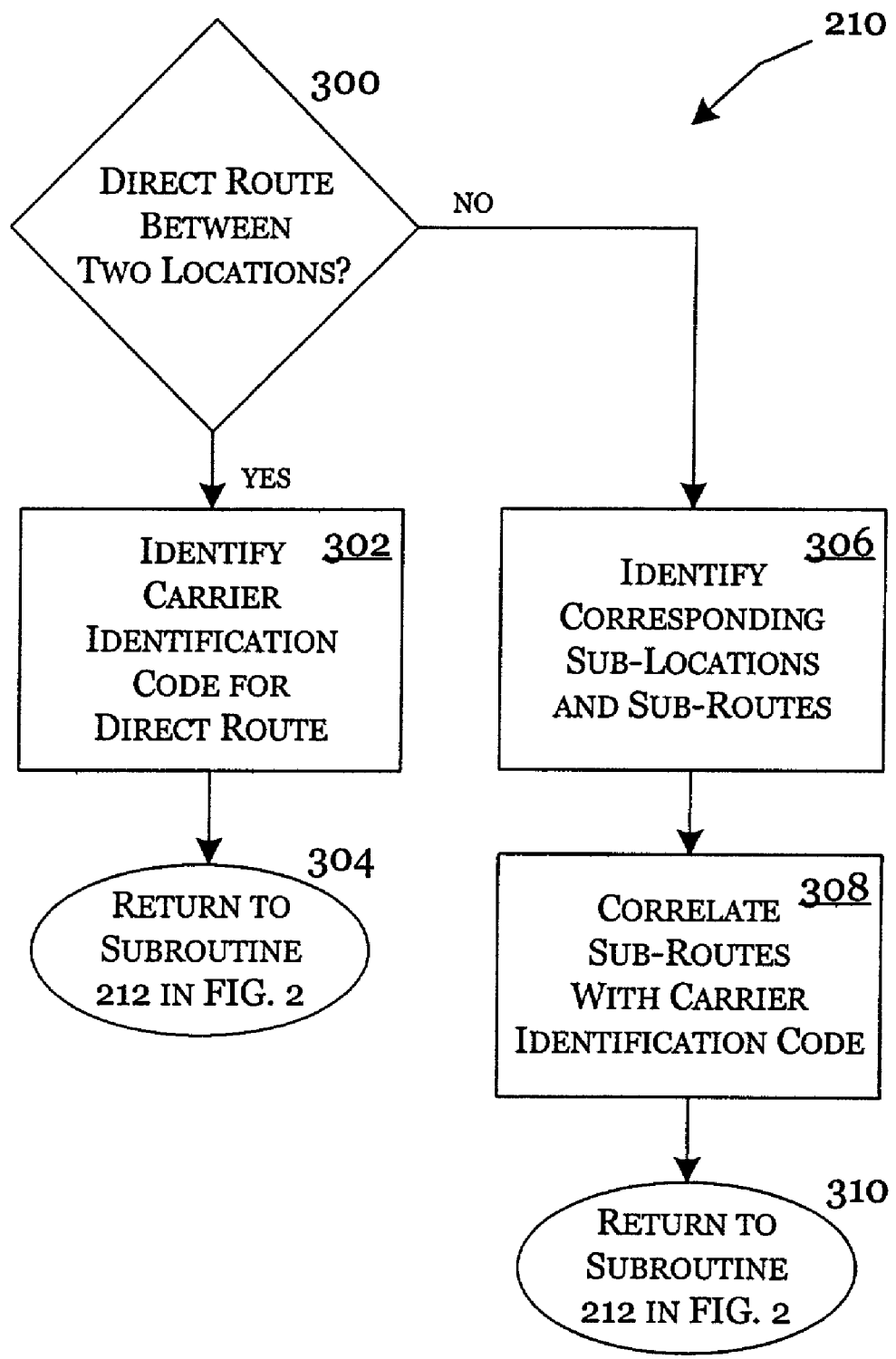
FIG. 3 is an exemplary embodiment of a subroutine of the method shown in FIG. 2.

FIG. 3 illustrates an exemplary embodiment of subroutine 210 described in FIG. 2. In subroutine 210, a set of routes between two central offices or hubs in a telecommunications network is generated.

Subroutine 210 begins at decision block 300 in which the invention determines whether a direct route exists between the two locations. If a direct route exists, then the "YES" branch is followed to block 302.

In block 302, a carrier identification code is identified that corresponds with a direct route between two locations corresponding with the user-selected end points.

Block 302 is followed by return block 304 in which the subroutine 210 returns to subroutine 212 of method 200 in FIG. 2.

Returning to decision block 302, if no direct route exists between two locations, then the "NO" branch is followed to block 306. In block 306, one or more sub-locations and corresponding sub-routes between the two locations are identified. Sub-locations are central offices or hubs that are located between the two locations corresponding with the user-selected end points. For example, if there is no direct route between central offices such as "Atlanta" and "Dunwoody", then a set of one or more sub-locations between the two designated central offices can be identified. In each set of sub-locations, an associated sub-route is also identified. Each sub-route connects to at least one identified sub-location. Each sub-route corresponds to a voice and/or data signal route between two central offices or hubs in a telecommunications network. For example, for the two designated locations above there may be one or more sub-locations, such as "Chamblee" and "Buckhead". In this example, there would be corresponding sub-routes from Dunwoody to Chamblee, from Chamblee to Buckhead, and from Buckhead to Atlanta. Utilizing the set of identified sub-locations and corresponding sub-routes, a continuous but indirect route can be formed between the two locations corresponding to the user-selected end points.

Block 306 is followed by block 308 in which each sub-route is correlated to a carrier identification code. Typically, each sub-route corresponds to a voice and/or data signal route between two central offices or hubs in a telecommunications network. A related database contains carrier identification codes that correspond to particular routes between locations. For each set of sub-locations identified in block 306, a corresponding set of carrier identification codes is determined. Each set of carrier identification codes uniquely identifies a particular set of voice and/or data signal routes between two central offices or hubs in a telecommunications network.

Block 310 is followed by block 312, in which the subroutine 210 returns to subroutine 212 of FIG. 2.

Figure 4:
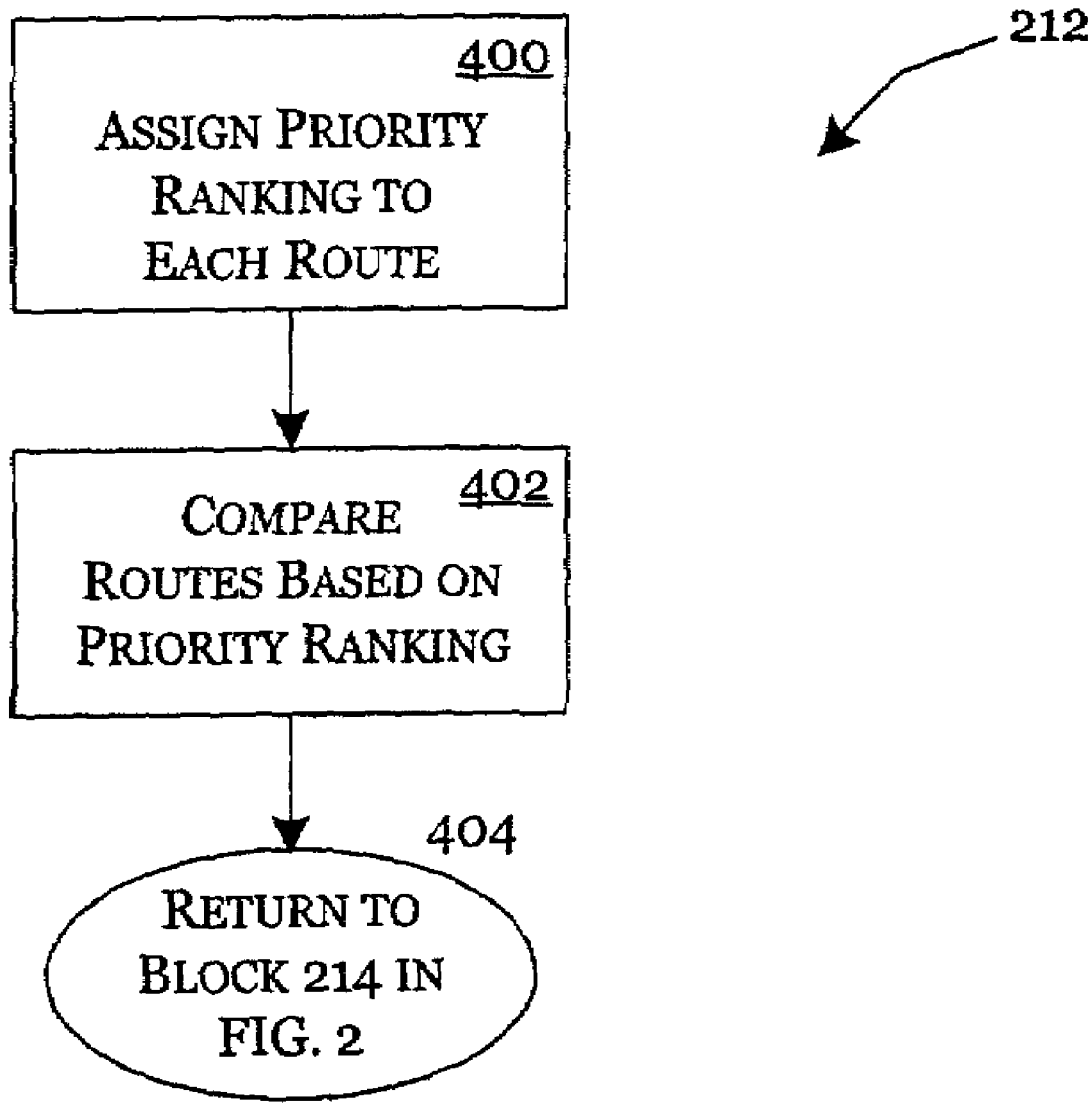
FIG. 4 is another exemplary embodiment of a subroutine of the method shown in FIG. 2.

FIG. 4 illustrates an exemplary embodiment for subroutine 212 in FIG. 2. In subroutine 212, a fundamental route is determined from the set of routes generated in subroutine 210. In block 400, the subroutine 212 begins.

Block 400 is followed by block 402 in which each route is assigned a ranking based upon at least one fundamental route criteria. A fundamental route criteria can be at least one of the following: distance between points, transmission equipment utilization, transmission capacity, or redundancy. For a route that includes one or more sub-routes, each sub-route can be assigned a ranking based upon at least one fundamental route criteria.

Block 402 is followed by block 404 in which the rankings of each route are compared to determine which route has the highest ranking based upon one or more fundamental route criteria. The highest ranked route will be considered the fundamental route between the two locations corresponding with the user-selected end points.

Block 404 is followed by block 406 in which the sub-routine 212 returns to the end block 214 in FIG. 2.

Figure 5:
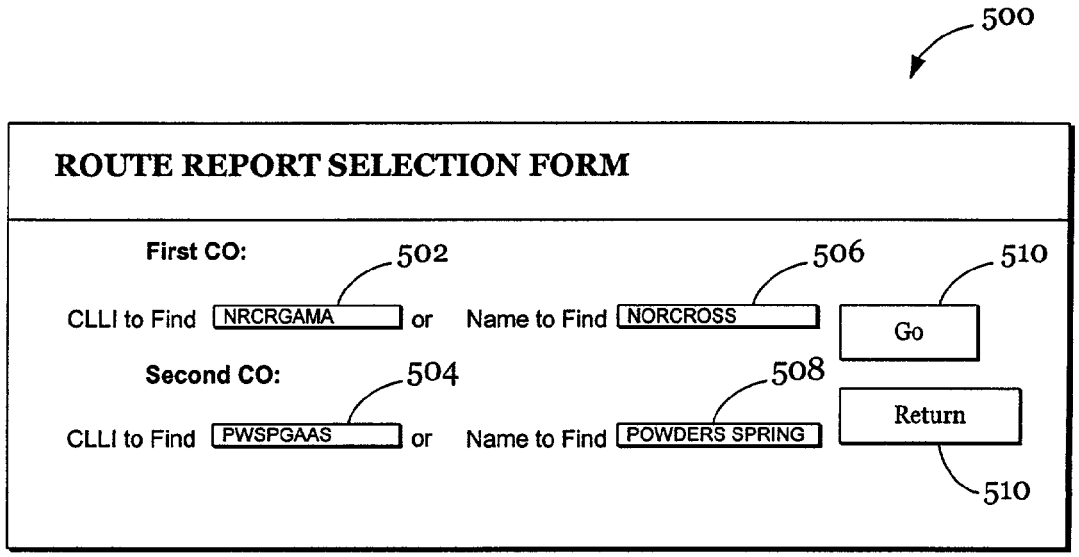
FIG. 5 is a screen shot of an introductory form of a screen user interface or webpage of a website that operates in conjunction with an exemplary embodiment of the invention.

FIG. 5 illustrates a screen shot of an introductory form of a screen user interface or webpage of a website that operates in conjunction with an exemplary embodiment of the invention. This particular screen shot shows a "Route Report Selection Form" 500 including a first code input box 502, a second code input box 504, a first city name input box 506, and a second city name input box 508. A user can utilize an input device 122 such as a keyboard 122a to enter location data for a starting point into the first code input box 502. By way of example, a user can type a CLLI code associated with a telecommunications network, such as a central office (CO) code, e.g. "NRCRGAMA" for "Norcross", as an initial starting point for a request for service into the first code input box 502. Further below the first code input box 502 is a second code input box 504. The user can further utilize an input device 122 such as a keyboard 122a to enter location data for an ending point into the second code input box 504. By way of example, a user can type a CLLI code associated with a telecommunications network, such as a central office (CO), e.g. "PWSPGAAS" for "Powder Springs", as an ending point for a request for service into the second code input box 504.

Alternatively, a user may enter a city name into the first city name input box 506, and/or a second city name input box 508. A user can utilize an input device 122 such as a keyboard 122a to enter location data for a starting point into the first city name input box 506, and/or a second city name input box 508.

A user may have the option of selecting from a list of CLLI codes and/or city names. When the input device 122 such as a mouse 122b is manipulated to the far right side of either a CLLI code input box 502, 504, or a city name input box 506, 508, then a drag down menu list of codes or city names is generated for the user to select from. The user then manipulates the mouse 122b to designate a choice of a CLLI code or city name for the CLLI code input box 502, 504, or the city name input box 506, 508.

When a starting point and ending point have been entered into the CLLI code input box 502, 504, and/or the city name input box 506, 508, the user can manipulate an input device 122 such as a mouse 122b to select the "GO" button 510. By depressing the "GO" button 510 with the click of an associated button of the mouse 122b, the invention begins to generate a fundamental route between the respective starting point and ending point.

When the first text input box and second text input box have received a respective starting point and ending point, the user then manipulates an input device 122 such as a mouse 122b to drag an arrow onto a "GO" button 510. By depressing the "GO" button 510 with the click of an associated button of the mouse 122b, the invention generates a fundamental route between the respective starting point and ending point.

When the user has input both an initial starting point and an initial ending point for a request for service, the location information can then be offered to the system as a "request for service". The system processes the location information and prompts the user with another form of the screen user interface or webpage of the website.

In the event that the user wants to change the initial starting point or the initial ending point, the user then manipulates an input device 122 such as a mouse 122b to drag an arrow onto a "RETURN" button 512. By depressing the "RETURN" button with the click of an associated button of the mouse 122b, the CLLI code input boxes 502, 504, and the city name input boxes 506, 508 are cleared, and the user can then re-enter information relating to a starting point and ending point.

Figure 6:
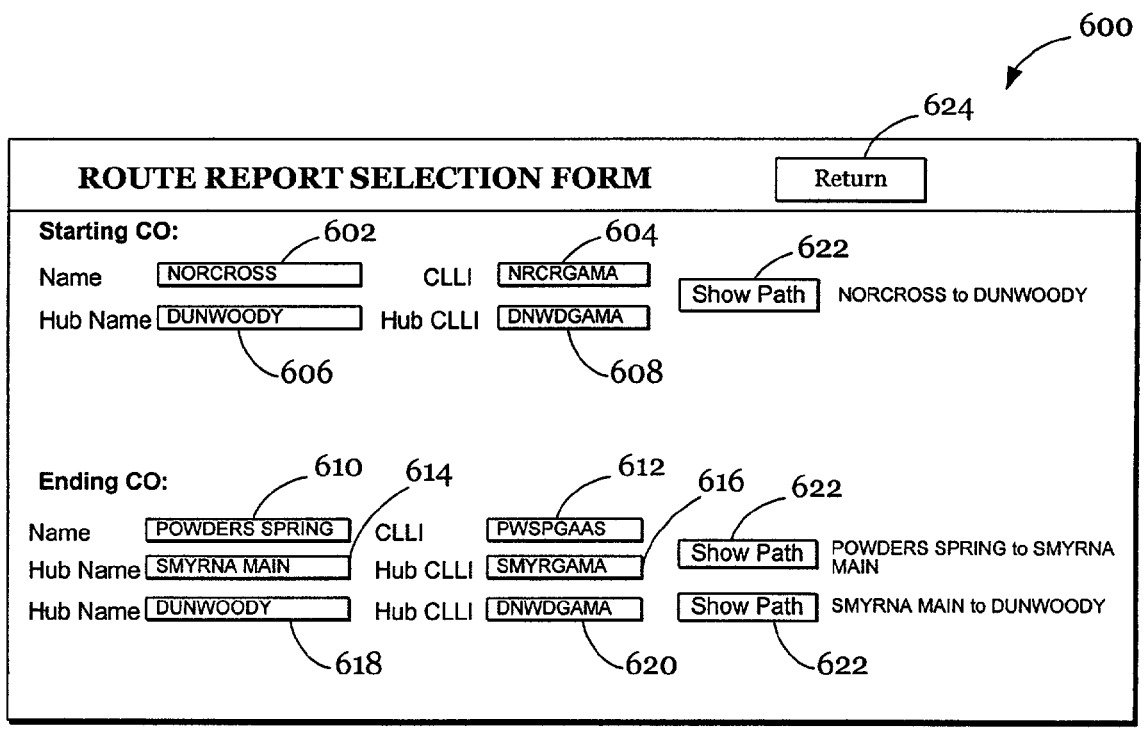
FIG. 6 is a screen shot of another form of a screen user interface or webpage of a website that operates in conjunction with an exemplary embodiment of the invention.

FIG. 6 is a screen shot of another form of a screen user interface or webpage of a website that operates in conjunction with an exemplary embodiment of the invention. This particular screen shot shows a "Route Report Selection Form" 600 including the initial starting point and initial ending point for a "request for service" previously entered in the prior "Route Report Selection Form" 500.

If the initial starting point and initial ending point is a direct route between the two points, then the system returns a single carrier identification code corresponding to that particular route. The carrier identification code can then be utilized to route data and/or voice signal traffic over a fiber optic cable between the two points.

However, if the initial starting point and initial ending point is an indirect route, then the system determines a series of indirect routes between the two points. For example, if the initial starting point is "Norcross" and the initial ending point is "Powder Springs", then the system determines that there is no direct route between these two points. The system creates a series of indirect routes with intermediate points between the initial starting point and initial ending point. For the example described, the system shows a first or starting indirect route between the initial starting point of "Norcross" and a first intermediate point "Dunwoody". The initial starting point is displayed in a first city name text box 602 and/or a first CLLI code text box 604; and the intermediate point is displayed in a second city name text box 606 and/or a second CLLI code text box 608.

Other selected indirect routes between intermediate points and the initial ending point are shown below the first city name text box 602 and first CLLI code text box 604. For example, an intermediate route between the initial ending point "Powders Spring" and a second intermediate point "Smyrna Main" is shown in a series of text boxes, including a third city name text box 610 and/or a corresponding third CLLI code text box 612, and a fourth city name text box 614 and/or a corresponding fourth CLLI code text box 616. Another intermediate route between the preceding intermediate point "Smyrna Main" and a fifth intermediate point "Dunwoody" is shown in a series of text boxes, including the fourth city name text box 614 and/or a corresponding fourth CLLI code text box 616, and a fifth city name text box 618 and/or a corresponding fifth CLLI code text box 620. Note that additional indirect paths between the initial starting point and initial ending point may be determined, and corresponding intermediate points are generated and displayed as needed.

A corresponding "SHOW PATH" button 622 is displayed to the right of the CLLI code text boxes 604, 608, 612, 616, 620. Each "SHOW PATH" button 622 corresponds to an indirect route, and provides the user with access to carrier path information displayed by another form of the screen user interface or webpage of the website. In the event that the user wants to access carrier path information, the user can manipulate an input device 122 such as a mouse 122b to drag an arrow onto the "SHOW PATH" button 622. By depressing the "SHOW PATH" button 622 with the click of an associated button of the mouse 122b, the invention calls previously stored carrier path identification codes corresponding to routes between identified points. These carrier path identification codes and other associated information is then displayed in another form of the screen user interface or webpage of the website, shown in FIGS. 7–9.

Using selected carrier path identification codes, one can determine a fundamental route between at least two central offices in a telecommunications network, determine a signal route between two locations in a telecommunications network, or determine a fundamental route in response to a request for service. FIGS. 7–9 are a series of screen shots of another form of a screen user interface or webpage of a website that operates in conjunction with an exemplary embodiment of the invention. When a "SHOW PATH" button 622 from the preceding FIG. 6 is selected, the invention displays a "Routing Report" as shown in FIGS. 7–9 which correspond to information provided in FIG. 6.

In the event that the user wants to change the initial starting point or the initial ending point, the user can manipulate an input device 122 such as a mouse 122b to drag an arrow onto a "RETURN" button 624. By depressing the "RETURN" button 624 with the click of an associated button of the mouse 122b, the system returns to the preceding screen user interface or webpage of a website as shown in FIG. 5, and the user can then re-enter information relating to a starting point and ending point.

The example shown in FIG. 7 shows a "Routing Report" form 700 including a report header 702 and a path information field 704. The report header 702 shows a route for which path information has been determined or otherwise previously stored by the invention, including a starting point and an ending point for either a direct route or indirect route between an initial starting point and an initial ending point.

The report header 702 in FIG. 7 shows a starting point or "A Location" 706 as a CLLI code "DNWDGAMA" corresponding to "Dunwoody"; and also shows an ending point or "Z Location" 708 as a CLLI code "NRCRGAMA" corresponding to "Norcross". Typically, the points or locations in the report header correspond with specific direct or indirect routes determined or otherwise previously stored by the invention, as shown in the preceding FIG. 6.

Following the report header 702, the path information field 704 shows one or more carrier paths associated with either a direct or indirect route. If one or more carrier paths exist between two points or locations, then identifying information about each carrier path can be displayed in the path information field 704. A carrier path is a specific fiber optical cable or network that can carry digital signal traffic between two locations or points. Since each carrier path is unique, identifying information must be associated with each carrier path so that the path can be uniquely identified and designated to carry specific digital signal traffic. In this example, the path information field 704 provides a sequence number, a SONET carrier identification number (SCID), and nodes associated with the SCID. As shown, a route between a starting location "DNWDGAMA" corresponding to "Dunwoody" and an ending location "NRCRGAMA" corresponding to "Norcross" has eight different carrier paths to select from. Each carrier path is numbered sequentially as indicated by the unique sequence number numbers 1–8. Next, a unique SONET carrier identification number (SCID) is associated with each carrier path, one such designation is "NG586R". Finally, information regarding nodes associated with each SCID is shown. This type of information can descriptively identify a characteristic, such as a capacity, of a particular type of fiber optical cable or network that is available for the transmitting signals on the route, such as "DS3/OC3", or "OC3". Furthermore, this type of information can identify a particular node or set of nodes associated with the carrier path, such as additional intermediate locations or points that are part of a single carrier path.

The example in FIG. 8 shows a "Routing Report" form 800 including a report header 802 and a path information field 804. In this particular example, the report header 802 shows a starting point or "A Location" 806 as a CLLI code "DNWDGAMA" corresponding to "Dunwoody"; and also shows an ending point or "Z Location" 808 as a CLLI code "SMYRGAMA" corresponding to "Smyrna Main". The path information field 804 provides a sequence number, a SONET carrier identification number (SCID), and nodes associated with the SCID. In this particular example, information regarding nodes associated with the SCID shows date information associated with scheduled maintenance outage dates or predicted availability of the carrier path, as well as particular type of fiber optical cable or network that is available for the transmitting signals on the route, and the particular node or set of nodes associated with the carrier path.

The example in FIG. 9 shows a "Routing Report" form 900 including a report header 902 and a path information field 904. In this particular example, the report header 902 shows a starting point or "A Location" 906 as a CLLI code "PWSPGAAS" corresponding to "Powder Springs"; and also shows an ending point or "Z Location" 908 as a CLLI code "SMYRGAMA" corresponding to "Smyrna Main". The path information field 904 provides a sequence number, a SONET carrier identification number (SCID), and nodes associated with the SCID. In this particular example, information regarding nodes associated with the SCID shows the particular type of fiber optical cable or network that is available for the transmitting signals on the route, and the particular node or set of nodes associated with the carrier path.

Alternative embodiments will become apparent to those skilled in the art to which the invention pertains without departing from the scope of the Applicant's invention. Accordingly, the scope of the invention is defined by the appended claims rather than the foregoing description.

The invention claimed is:

1. A method for determining a fundamental route between two locations in a network, comprising:
   receiving a request for service between locations in the network;
   receiving location information associated with the locations;
   correlating the location information to a respective carrier identification code, wherein the carrier identification code corresponds to a particular signal route from at least one location to another location in the network;
   generating the fundamental route from the set of signal routes between the locations based upon one or more fundamental route criteria, wherein generating a set of signal routes comprises:
   determining one or more sub-locations between two locations in the network; and correlating a sub-location to a respective carrier identification code, wherein each carrier identification code corresponds to a particular signal route from at least one sub-location to either another sub-location or a location in the network; and selecting the fundamental route from the set of signal routes, wherein selecting the fundamental route comprises:

assigning a priority value to each signal route in the set of signal routes;

comparing the priority value of each signal route, wherein at least one priority value designates the fundamental route.

2. A system for determining a fundamental route between two locations in a telecommunications network, comprising:

a database configured for,
storing a carrier identification code corresponding to a particular signal route between locations in a telecommunications network;

a processor configured for,
receiving a request for service between locations in the telecommunications network;
receiving location information associated with the designated locations;
correlating the location information to the carrier identification code;
generating a set of signal routes between the locations based upon one or more fundamental route criteria, wherein generating a set of signal routes comprises:
determining one or more sub-locations between two locations in the network; and
correlating a sub-location to a respective carrier identification code, wherein each carrier identification code corresponds to a particular signal route from at least one sub-location to either another sub-location or a location in the network; and
selecting the fundamental route from the set of signal routes, wherein selecting the fundamental route comprises:
assigning a priority value to each signal route in the set of signal routes; and
comparing the priority value of each signal route, wherein at least one priority value designates the fundamental route.

3. The system of claim 2, wherein the locations consist of at least one of the following: end offices in a telecommunications network or central offices in a telecommunications network.

4. The system of claim 2, wherein the carrier identification code is a SONET carrier identification number.

5. The system of claim 2, wherein the database is a spreadsheet stored in a memory device.

6. The system of claim 2, wherein the fundamental route criteria consists of at least one of the following: distance between points, transmission equipment utilization, transmission capacity, or redundancy.

7. A system for determining a fundamental route between two locations in a telecommunications network, comprising a database configured for,
storing a carrier identification code corresponding to a particular signal route between locations in a telecommunications network;

a processor configured for,
receiving a request for service between locations in the telecommunications network;
receiving location information associated with the designated locations;
correlating the location information to the carrier identification code;
generating a set of signal routes between the locations based upon one or more fundamental route criteria, wherein generating a set of signal routes comprises:
determining one or more sub-locations between two locations in the network; and
correlating a sub-location to a respective carrier identification code, wherein each carrier identification code corresponds to a particular signal route from at least one sub-location to either another sub-location or a location in the network; and
selecting the fundamental route from the set of signal routes, wherein selecting the fundamental route comprises:
assigning a priority value to each signal route in the set of signal routes; and
comparing the priority value of each signal route, wherein at least one priority value designates the fundamental route.

8. A computer-readable medium with computer executable instructions which, when executed on a computer, cause the computer to perform a method for determining a fundamental route between two central offices in a telecommunications network, the method comprising:
receiving location information associated with designated central offices in a request for service;
correlating the location information to a carrier identification code, wherein the carrier identification code corresponds to a particular signal route from at least one central office to another central office in the network;
generating the fundamental route from the set of signal routes between the two central offices based upon one or more fundamental route criteria, wherein generating the fundamental route comprises;
determining one or more sub-locations between the two central offices in the network; and
correlating a sub-location to a respective carrier identification code, wherein each carrier identification code corresponds to a particular signal route from at least one sub-location to either another sub-location or a central office in the network: and
selecting the fundamental route from the set of signal routes, wherein selecting the fundamental route comprises:
assigning a priority value to each signal route in the set of signal routes; and
comparing the priority value of each signal route, wherein at least one priority value designates the fundamental route.

* * * * *